United States Patent [19]
Lee et al.

[11] Patent Number: 6,125,005
[45] Date of Patent: Sep. 26, 2000

[54] ALTITUDE INSENSITIVE AIR BEARING USING PITCH COMPENSATION FOR DATA STORAGE APPLICATION

[75] Inventors: Francis Chee-Shuen Lee; Robert Nolan Payne; Ullal Vasant Nayak, all of San Jose, Calif.

[73] Assignee: International Business Machines Corporation, Armonk, N.Y.

[21] Appl. No.: 09/000,561

[22] Filed: Dec. 30, 1997

[51] Int. Cl.[7] ........................................................ G11B 5/60
[52] U.S. Cl. ............................................................. 360/103
[58] Field of Search ............................................. 360/103

[56] References Cited

U.S. PATENT DOCUMENTS

| | | | |
|---|---|---|---|
| 5,424,888 | 6/1995 | Hendriks et al. | 360/103 |
| 5,606,476 | 2/1997 | Chang et al. | 360/103 |
| 5,673,161 | 9/1997 | Yanagisawa et al. | 360/103 |
| 5,726,831 | 3/1998 | White | 360/103 |
| 5,761,003 | 6/1998 | Sato | 360/103 |
| 5,796,551 | 8/1998 | Samuelson | 360/103 |

*Primary Examiner*—John H. Wolff
*Attorney, Agent, or Firm*—Khanh Q. Tran; Banner & Witcoff, Ltd.

[57] ABSTRACT

An air bearing slider for supporting a magnetic read/write head on a moving disk includes at least one front force carrying pad located in front of a suspension pivot point of an air bearing slider, at least one rear force-carrying pad located behind the suspension pivot point of the air bearing slider, and a trailing-edge pad having a magnetic read/write head embedded in a rear portion of the trailing-edge pad. Each front force-carrying pad carries a front air bearing force that is generated by a relative motion between a surface of the disk and the slider when the surface of the disk has a predetermined disk velocity with respect to the slider. Each rear force-carrying pad carries a rear air bearing force that is generated by the relative motion between the surface of the disk and the slider. The trailing edge pad carries substantially no air bearing force. According to the invention, as an atmospheric pressure associated with the air bearing slider decreases, a flying height associated with each front force-carrying pad and each rear force-carrying pad decreases so that a pitch angle of the air bearing slider decreases and a flying height associated with the trailing-edge pad at the magnetic read/write head changes by less than 5 nm at a predetermined disk velocity.

12 Claims, 4 Drawing Sheets

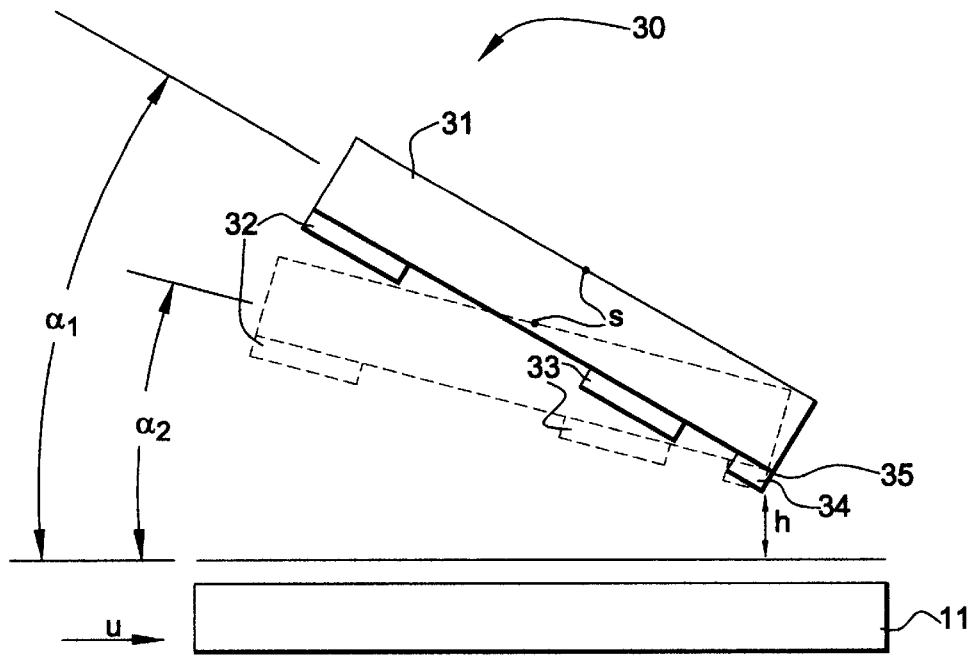
FIG. 3
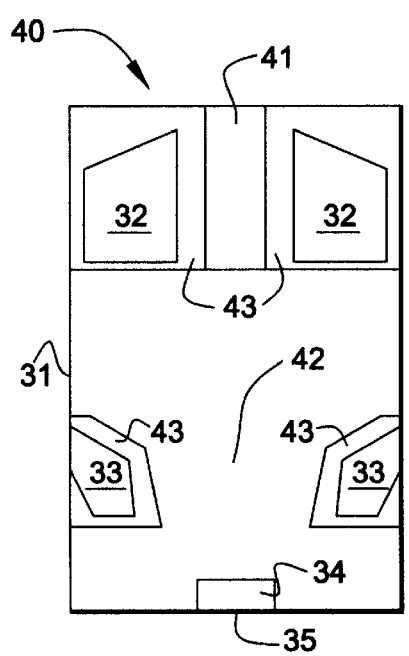
FIG. 4A
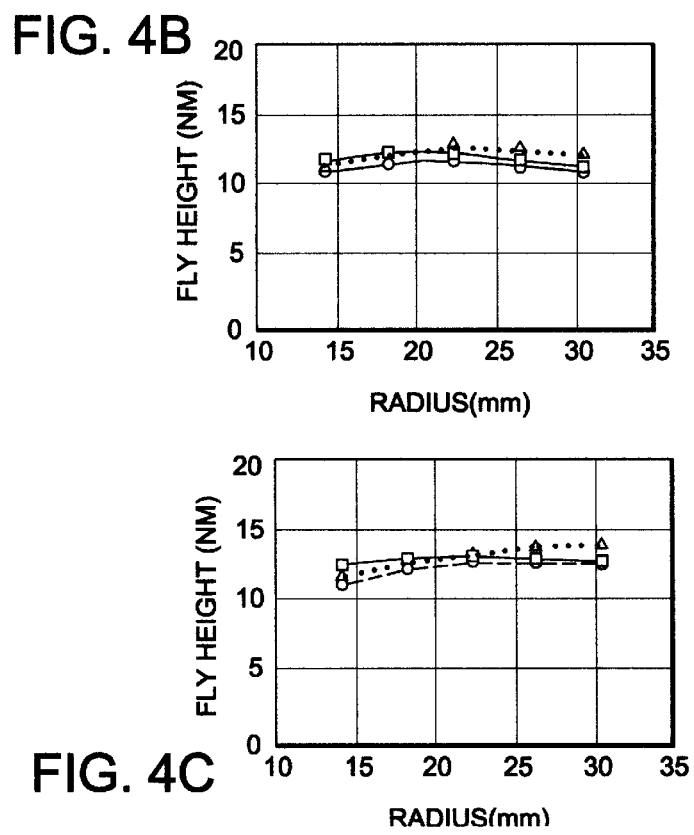
FIG. 4B
FIG. 4C

ALTITUDE INSENSITIVE AIR BEARING USING PITCH COMPENSATION FOR DATA STORAGE APPLICATION

BACKGROUND OF THE INVENTION

1. Field of the Invention

The present invention relates to the field of data storage devices. More particularly, the present invention relates to an air bearing slider for use with a read/write head of a disk drive.

2. Description of the Related Art

FIG. 1 shows a high RPM disk drive 10 having a two-stage, or piggy-back, servo system for positioning a magnetic read/write head (or a recording slider) over a selected track on a magnetic disk 11. The two-stage servo system includes a voice-coil motor (VCM) 13 for coarse positioning a read/write head suspension 12 and a microactuator, or micropositioner, for fine positioning the read/write head over the selected track. FIG. 2 shows an enlarged exploded view of the read/write head end of suspension 11. An electrostatic rotary microactuator 14 is attached to a gimbal structure 15 on suspension 12, and a slider 16 is attached to the microactuator. A read/write head 17 is fabricated as part of slider 16.

Air bearing slider designs for a data storage applications, such as the disk drive 10, provide a flying interface between a magnetic head and a magnetic medium recording disk. The interface is cushioned by a thin layer of air that prevents excessive, undesirable head/disk contacts that can cause damage to the head or the disk. The air bearing force that acts to maintain the head/disk spacing, however, is influenced by the atmospheric pressure. As the atmospheric pressure decreases, such as when a disk drive is used at an altitude above sea level, the flying height of the air bearing slider usually decreases and unwanted head/disk contacts may occur. In the situation when the flying height of the air bearing slider increases as the atmospheric pressure decreases, the magnetic read head may lose signal amplitude, therefore rendering the disk drive non-functional.

It has always been a primary design objective to minimize the altitude flying height change of a magnetic element on an air bearing slider as a function of atmospheric pressure. Conventional positive-pressure air bearing designs have a large altitude sensitivity. Conventional negative-pressure air bearing designs have improved the altitude sensitivity of sliders, but have not totally eliminating the effect.

What is needed is an air bearing slider that is virtually altitude insensitive, and is applicable to both positive- and negative-pressure air bearing types.

SUMMARY OF THE INVENTION

The present invention provides an air bearing slider that is virtually altitude insensitive, and is applicable for both positive- and negative-pressure air bearing types. The advantages of the present invention are provided by an air bearing slider that includes at least one front force-carrying pad located in front of a suspension pivot point of an air bearing slider, at least one rear force-carrying pad located behind the suspension pivot point of the air bearing slider, and a trailing-edge pad having a magnetic read/write head embedded in a rear portion of the trailing-edge pad. Each front force-carrying pad carries a front air bearing force, while each rear force-carrying pad carries a rear air bearing force. The trailing edge pad carries substantially no air bearing force. According to the invention, as an atmospheric pressure associated with the air bearing slider decreases, a flying height associated with each front force-carrying pad and each rear force-carrying pad decreases so that a pitch angle of the air bearing slider decreases and a flying height associated with the trailing-edge pad at the magnetic read/write head changes by less than 5 nm at a predetermined disk velocity.

One embodiment of the present invention is a negative-pressure air bearing slider having two front force-carrying pads and two rear force-carrying pads. Another embodiment of the present invention is a negative-pressure air bearing slider having two front force-carrying pads and one rear force-carrying pad. Still another embodiment of the present invention is a positive-pressure air bearing slider having two front force-carrying pads and two rear force-carrying pads. Yet another embodiment of the present invention is a positive-pressure air bearing slider having two front force-carrying pads and one rear force-carrying pad.

BRIEF DESCRIPTION OF THE DRAWING

The present invention is illustrated by way of example and not limitation in the accompanying figures in which like reference numerals indicate similar elements and in which:

FIG. 3 shows a side view of an air bearing slider having pitch compensation according to the present invention;

FIG. 4A shows an exemplary omnipad configuration for a negative- or a positive-pressure air bearing slider according to the present invention;

FIGS. 4B and 4C respectively show minimum fly height and element fly height versus radius of rotation for different atmospheric pressures for the negative-pressure omnipad air bearing slider configuration of FIG. 4A;

DETAILED DESCRIPTION

Figure 1:
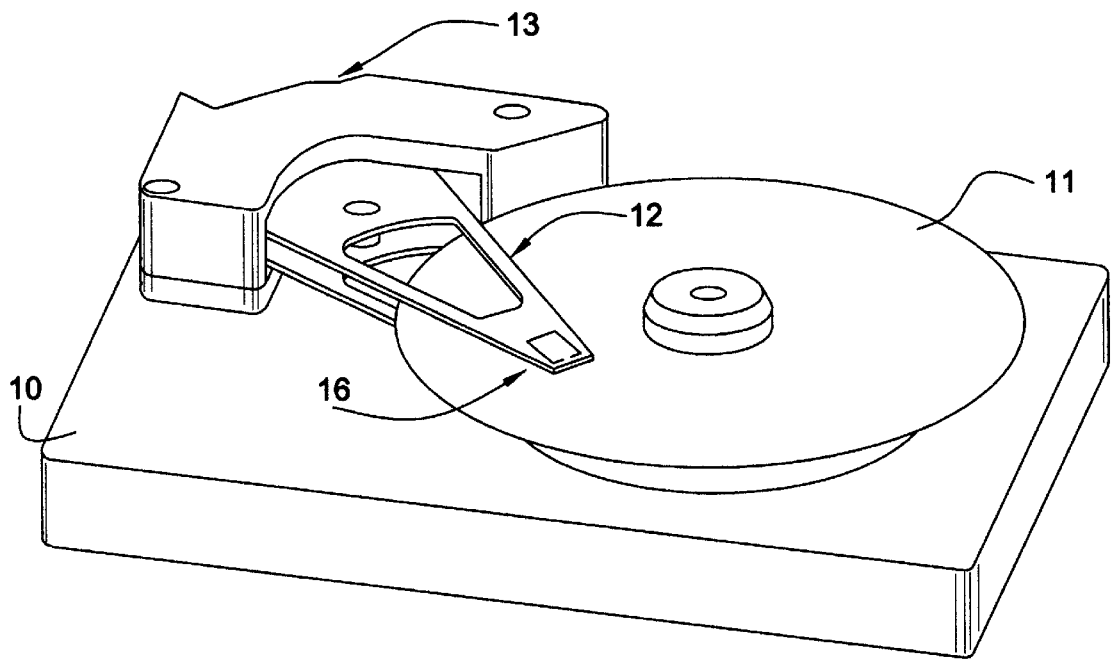
FIG. 1 shows a disk drive having a two-stage servo system for positioning a recording slider over a selected track on a magnetic disk.
Figure 2:
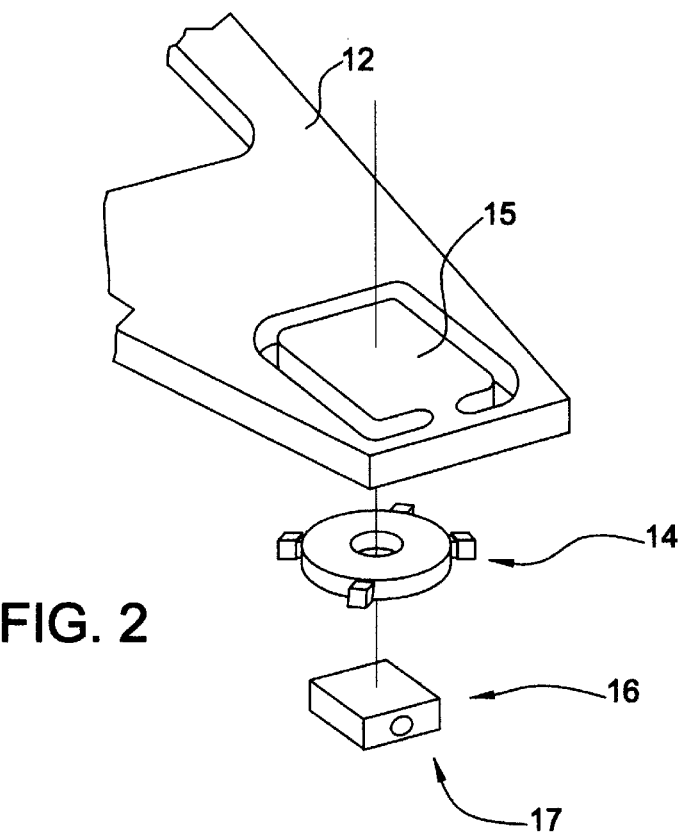
FIG. 2 shows an enlarged exploded view of the read/write head end of a disk drive suspension.

The present invention provides an altitude insensitive air bearing slider (AIABS) that is applicable for both positive- and negative-pressure air bearing types. FIG. 3 shows a side view of an air bearing slider 30 having pitch compensation according to the present invention. Air bearing slider 30 includes a slider body 31 that is attached to a suspension in a well-known manner. Point S on slider body 31 is the pivot point of the suspension. Slider 30 also includes at least one front force-carrying pad 32 located in front of suspension pivot point S, and at least one rear force-carrying pad 33 located behind suspension pivot point S. A trailing-edge pad 34 is attached to slider 30 at a rear edge of slider 30. Trailing-edge pad 34 has a magnetic read/write head 35 that is embedded in a rear portion of trailing-edge pad 34.

Each front force-carrying pad 32 carries a front air bearing force. Similarly, each rear force-carrying pad 33 carries a rear air bearing force. According to the invention, trailing edge pad 34 carries substantially no air bearing force. As an atmospheric pressure associated with air bearing slider 30 decreases, a flying height associated with each front force-carrying pad 32 and each rear force-carrying pad 33 decreases so that a pitch angle $\alpha$ of the air bearing slider decreases and a flying height h associated with trailing-edge pad 34 changes by less than 5 nm at a predetermined disk velocity U. For example, slider 30 has a pitch angle $\alpha_1$ at sea level for a predetermined disk velocity U. As the atmospheric pressure decreases, either through a weather-related change in an ambient atmospheric pressure or by an increase in altitude, the pitch angle of slider 30 decreases to pitch angle $\alpha_2$. Flying height h of trailing-edge pad 34 remains substantially the same, whether the pitch angle of slider 30 is $\alpha_1$ or $\alpha_2$.

FIG. 4A shows an exemplary omnipad configuration 40 for a negative-pressure air bearing according to the present invention. FIGS. 4B and 4C respectively show minimum fly height and element fly height versus radius of rotation for different atmospheric pressures for the negative-pressure omnipad air bearing slider configuration of FIG. 4A. Omnipad configuration 40 can be made to be a negative-pressure type air bearing slider using a shallow etch process in a well-known manner to form step areas 41 and 43, with a step area 42 being formed by a deep etch process in a well-known manner. Alternatively, omnipad configuration 40 can be made to be a positive-pressure type air bearing slider using a deep etch process in a well-known manner to form step areas 41 and 42, with step area 43 being formed by a shallow etch process in a well-known manner. In FIGS. 4B and 4C (and FIGS. 5B, 5C, 6B, 6C, 7B, 7C, 8B and 8C), a square-shaped data point is at sea level, a diamond-shaped data point is at 5000 feet above sea level, and a triangular-shaped data point is at 10,000 feet above sea level. At any radius of rotation, the flying height h associated with trailing-edge pad 34 changes by less than 5 nm as the atmospheric pressure decreases.

Figure 5A:
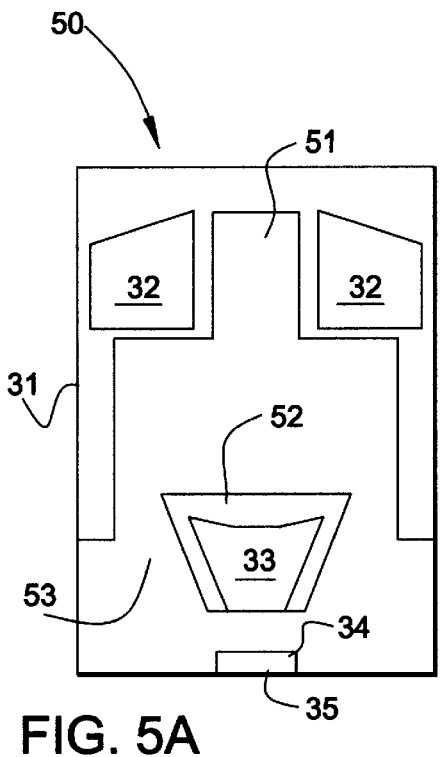
FIG. 5A shows a first exemplary four-pad configuration for a negative-pressure air bearing slider according to the present invention.
Figure 5B:
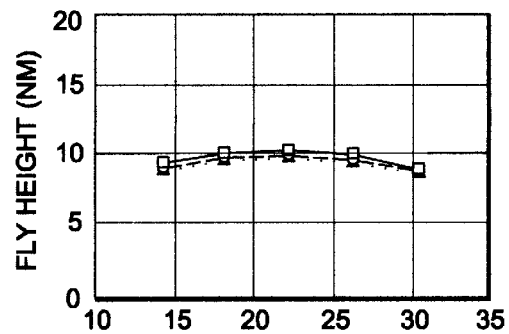
FIGS. 5B and 5C respectively show minimum fly height and element fly height versus radius of rotation for different atmospheric pressures for the first negative-pressure four-pad air bearing slider configuration of FIG. 5A.
Figure 5C:
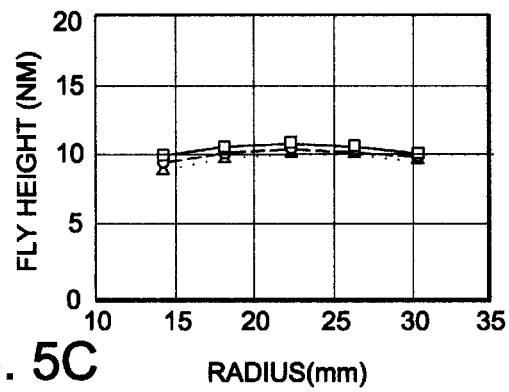

FIG. 5A shows a first exemplary four-pad configuration 50 for a negative-pressure air bearing slider according to the present invention. FIGS. 5B and 5C respectively show minimum fly height and element fly height versus radius of rotation for different atmospheric pressures for the first negative-pressure four-pad air bearing slider configuration 50 of FIG. 5A. In FIG. 5A, two front force-carrying pads 32 are separated by a gap 51, which is part of an etch region 53, while the rear force-carrying pad 33 is a single rear force-carrying pad. The first four-pad configuration 50, as with the configuration shown in FIG. 6A, can be made to be a negative-pressure type air bearing slider using a shallow etch process in a well-known manner to form step area 52 and a deep etch process in a well-known manner to form step area 53.

Figure 6A:
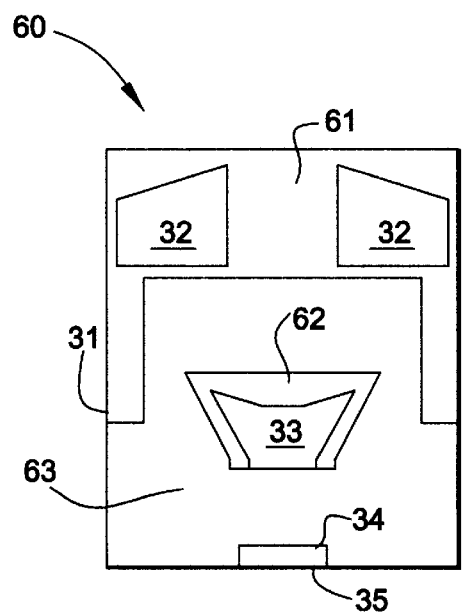
FIG. 6A shows a second exemplary four-pad configuration for a negative-pressure air bearing slider according to the present invention.
Figure 6B:
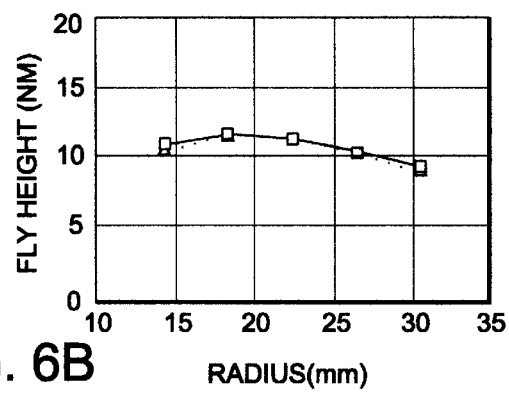
FIGS. 6B and 6C respectively show minimum fly height and element fly height versus radius of rotation for different atmospheric pressures for the second negative-pressure four-pad air bearing slider configuration of FIG. 6A.
Figure 6C:
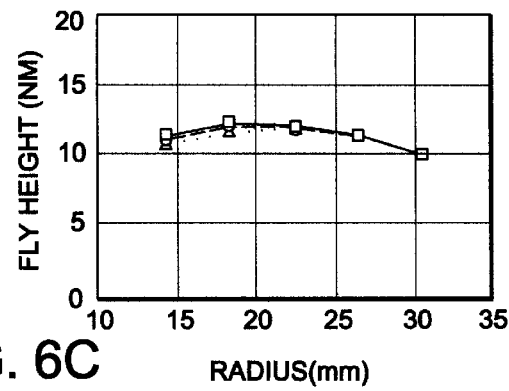

FIG. 6A shows a second exemplary four-pad configuration 60 for a negative-pressure air bearing slider according to the present invention. FIGS. 6B and 6C respectively show minimum fly height and element fly height versus radius of rotation for different atmospheric pressures for the second negative-pressure four-pad air bearing slider configuration 60 of FIG. 6A. In FIG. 6A, two front force-carrying pads 32 are separated by a gap 61, which is part of a shallow etch region 52, while the rear force-carrying pad 33 is a single rear force-carrying pad.

Figure 7A:
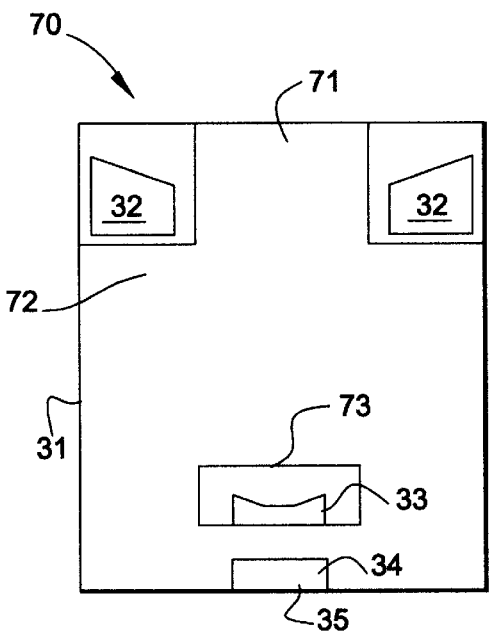
FIG. 7A shows a first exemplary four-pad configuration for a positive-pressure air bearing slider according to the present invention.
Figure 7B:
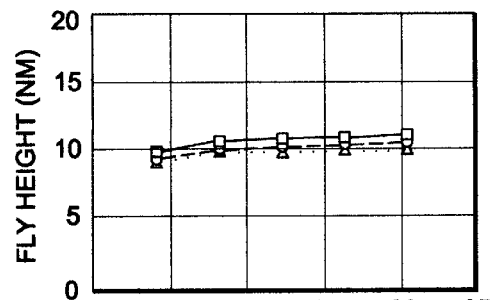
FIGS. 7B and 7C respectively show minimum fly height and element fly height versus radius of rotation for different atmospheric pressures for the first positive-pressure four-pad air bearing slider configuration of FIG. 7A.
Figure 7C:
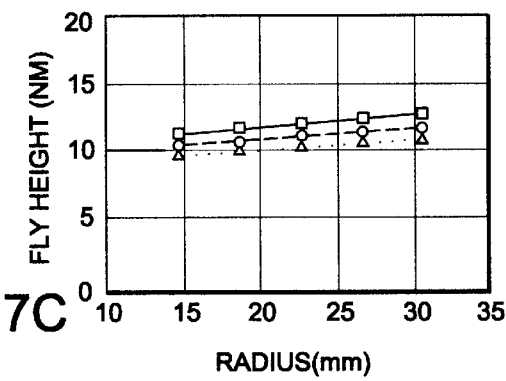

FIG. 7A shows a first exemplary four-pad configuration for a positive-pressure air bearing slider 70 according to the present invention. FIGS. 7B and 7C respectively show minimum fly height and element fly height versus radius of rotation for different atmospheric pressures for the first positive-pressure four-pad air bearing slider configuration 70 of FIG. 7A. In FIG. 7A, two front force-carrying pads 32 are separated by a gap 71, which is part of a deep etch region 72, while the rear force-carrying pad 33 is a single rear force-carrying pad surrounded by a shallow etch region 73.

Figure 8A:
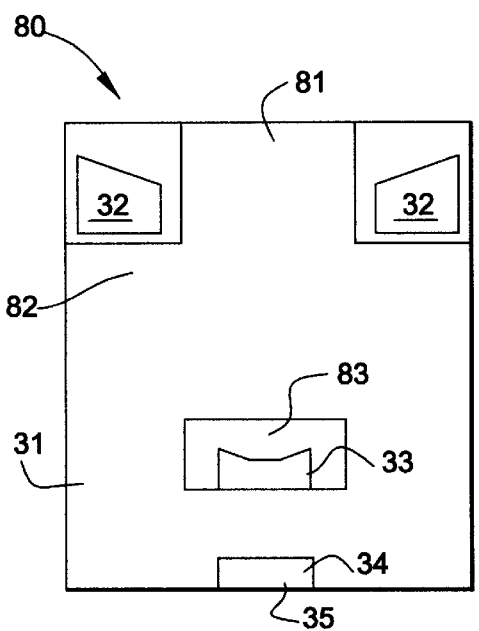
FIG. 8A shows a second exemplary four-pad configuration for a positive-pressure air bearing slider according to the present invention.
Figure 8B:
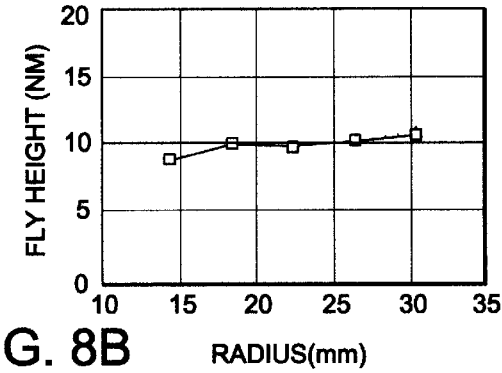
FIGS. 8B and 8C respectively show minimum fly height and element fly height versus radius of rotation for different atmospheric pressures for the second positive-pressure four-pad air bearing slider configuration of FIG. 8A.
Figure 8C:
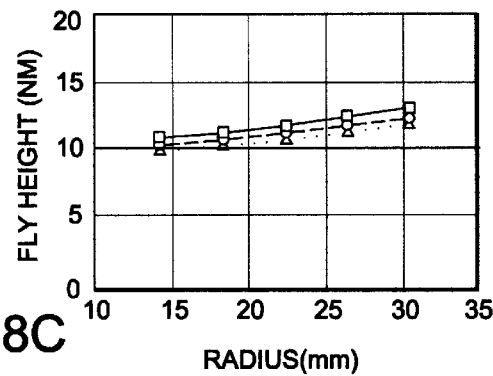

FIG. 8A shows a second exemplary four-pad configuration 80 for a positive-pressure air bearing slider according to the present invention. FIGS. 8B and 8C respectively show minimum fly height and element fly height versus radius of rotation for different atmospheric pressures for the second positive-pressure four-pad air bearing slider configuration of FIG. 8A. In FIG. 8A, two front force-carrying pads 32 are separated by a gap 81, which is part of a deep etch region 82, while the rear force-carrying pad 33 is a single rear force-carrying pad surrounded by a shallow etch region 83. Configuration 80 differs from configuration 70 by rear force-carrying pad 33 of configuration 80 being larger and farther forward than rear force carrying pad 33 of configuration 70.

While the present invention has been described in connection with the illustrated embodiments, it will be appreciated and understood that modifications may be made without departing from the true spirit and scope of the invention.

What is claimed is:

1. An air bearing slider for supporting a magnetic read/write head over a moving magnetic disk, the air bearing slider comprising:

at least one front force-carrying pad located in front of a suspension pivot point of an air bearing slider, each front force-carrying pad carrying a front air bearing force that is generated by a relative motion between a surface of the disk and the slider, the surface of the disk having a predetermined disk velocity with respect to the slider;

at least one rear force-carrying pad located behind the suspension pivot point of the air bearing slider, each rear force-carrying pad carrying a rear air bearing force that is generated by the relative motion between the surface of the disk and the slider at the predetermined disk velocity; and a trailing-edge pad having a magnetic read/write head embedded in a rear portion of the trailing-edge pad, the trailing edge pad carrying substantially no air bearing force that is generated by the relative motion between the surface of the disk and the slider at the predetermined disk velocity;

a flying height associated with each front force-carrying pad and each rear-carrying pad with respect to the surface of the disk decreasing as an atmospheric pressure associated with the slider decreases, thereby pivoting the slider around the suspension pivot point and causing a pitch angle of the air bearing slider with respect to the surface of the disk to decrease.

2. The air bearing slider according to claim 1, wherein as the atmospheric pressure associated with the air bearing slider decreases, a flying height associated with the trailing-edge pad at the magnetic read/write head changes by less than 5 nm at the predetermined disk velocity.

3. The air bearing slider according to claim 2, wherein the air bearing slider is a negative-pressure air bearing slider having two front force-carrying pads and two rear force-carrying pads.

4. The air bearing slider according to claim 2, wherein the air bearing slider is a negative-pressure air bearing slider having two front force-carrying pads and one rear force-carrying pad.

5. The air bearing slider according to claim 2, wherein the air bearing slider is a positive-pressure air bearing slider having two front force-carrying pads and two rear force-carrying pads.

6. The air bearing slider according to claim 2, wherein the air bearing slider is a positive-pressure air bearing slider having two front force-carrying pads and one rear force-carrying pad.

7. A disk drive, comprising:

a magnetic disk that moves; and a read/write head suspension having an air bearing slider for supporting a magnetic read/write head over the disk when the disk moves, the air bearing slider including, at least one front force-carrying pad located in front of a suspension pivot point of an air bearing slider, each front force-carrying pad carrying a front air bearing force that is generated by a relative motion between a surface of the disk and the slider, the surface of the disk having a predetermined disk velocity with respect to the slider;

at least one rear force-carrying pad located behind the suspension pivot point of the air bearing slider, each rear force-carrying pad carrying a rear air bearing force that is generated by the relative motion between the surface of the disk and the slider at the predetermined disk velocity; and a trailing-edge pad having a magnetic read/write head embedded in a rear portion of the trailing-edge pad, the trailing edge pad carrying substantially no air bearing force that is generated by the relative motion between the surface of the disk and the slider at the predetermined disk velocity;

a flying height associated with each front force-carrying pad and each rear-carrying pad with respect to the surface of the disk decreasing as an atmospheric pressure associated with the slider decreases, thereby pivoting the slider around the suspension pivot point and causing a pitch angle of the air bearing slider with respect to the surface of the disk to decrease.

8. The disk drive according to claim 7, wherein as the atmospheric pressure associated with the air bearing slider decreases, a flying height associated with the trailing-edge pad at the magnetic read/write head changes by less than 5 nm at predetermined disk velocity of the magnetic disk.

9. The disk drive according to claim 8, wherein the air bearing slider is a negative-pressure air bearing slider having two front force-carrying pads and two rear force-carrying pads.

10. The disk drive according to claim 8, wherein the air bearing slider is a negative-pressure air bearing slider having two front force-carrying pads and one rear force-carrying pad.

11. The disk drive according to claim 8, wherein the air bearing slider is a positive-pressure air bearing slider having two front force carrying pads and two rear force-carrying pads.

12. The disk drive according to claim 8, wherein the air bearing slider is a positive-pressure air bearing slider having two front force-carrying pads and one rear force-carrying pad.

* * * * *